United States Patent Office 3,072,379

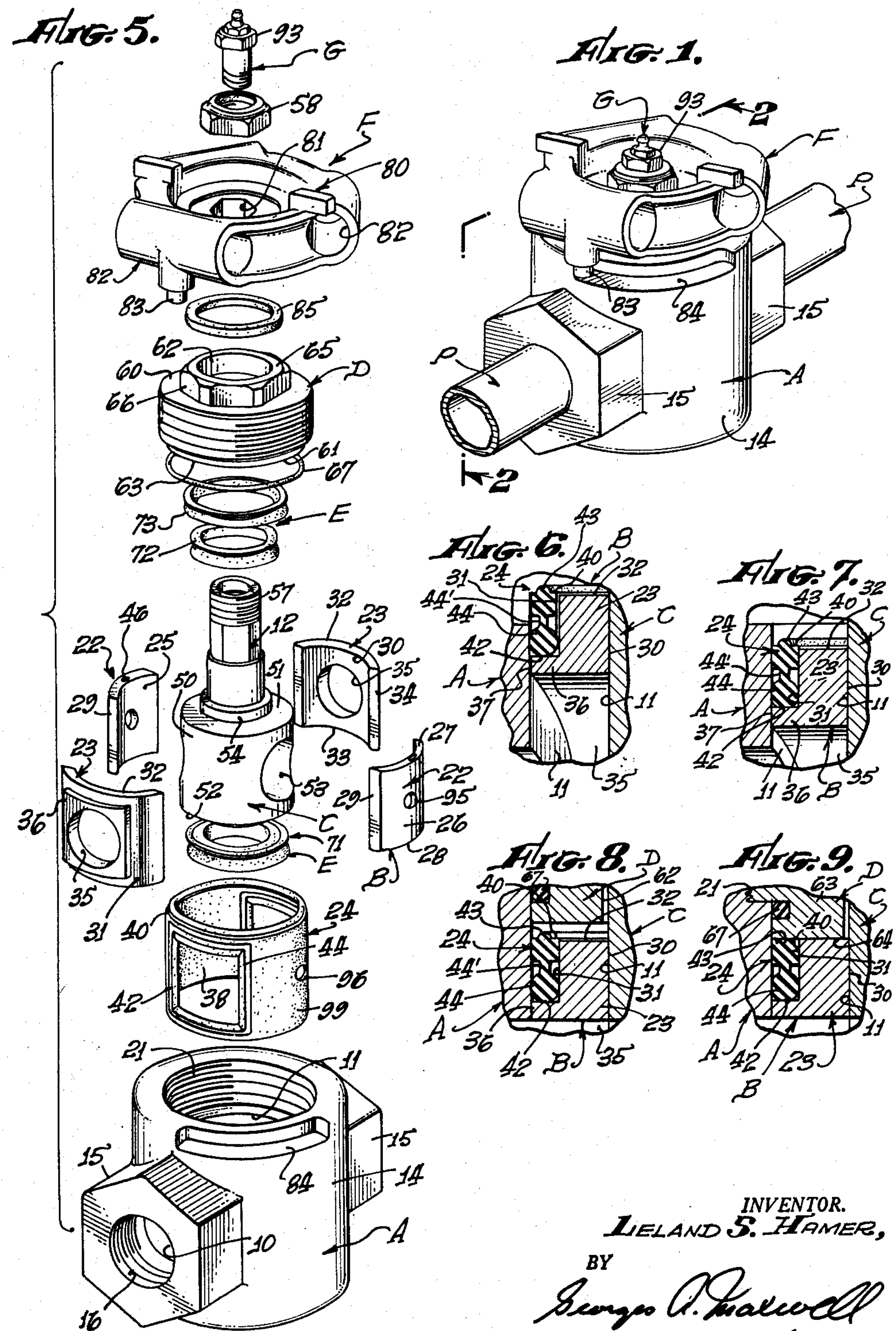
INVENTOR.
LELAND S. HAMER,
BY
George A. Maxwell
AGENT.

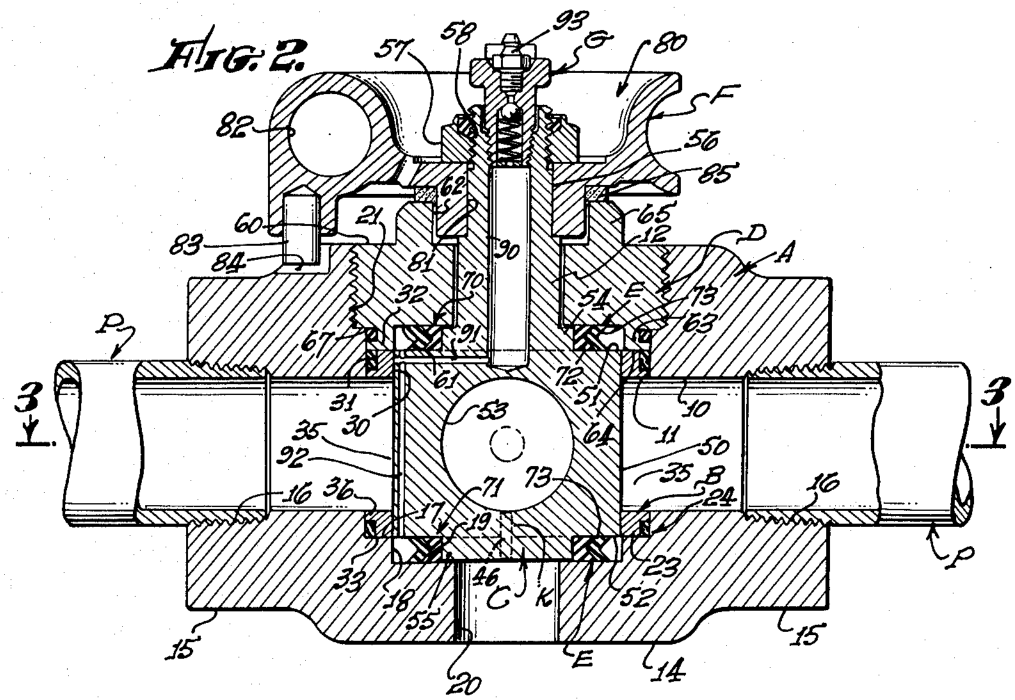
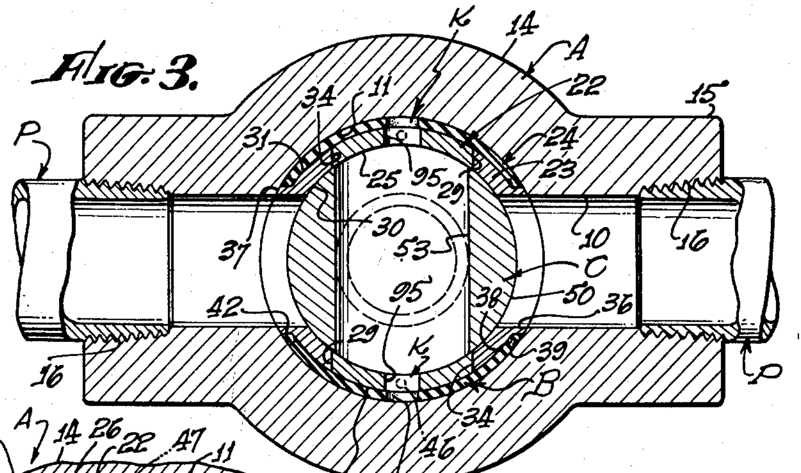
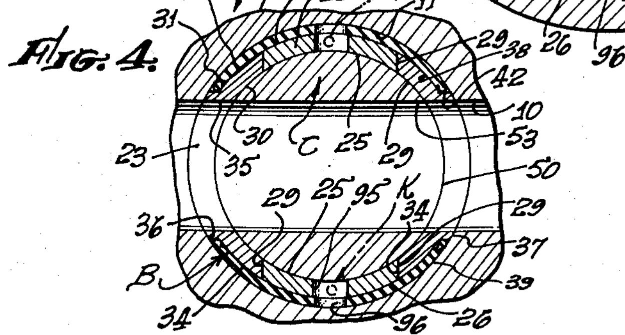
INVENTOR.
LIELAND S. HAMER,
BY
George A. Maxwell
AGENT.

Patented Jan. 8, 1963

3,072,379

ROTARY VALVE HAVING SEGMENTAL SEAT INSERTS AND A RESILIENT RETAINING SLEEVE

Leland S. Hamer, Long Beach, Calif., assignor, by mesne assignments, to FMC Corporation, San Jose, Calif., a corporation of Delaware Filed Aug. 4, 1958, Ser. No. 752,922
10 Claims. (Cl. 251—171)

This invention relates to a valve and is more particularly concerned with an improved plug valve construction.

The ordinary plug valve is characterized by a body with a flow passage extending therethrough, a tapered valve chamber in the body and intersecting the flow passage and a tapered apertured plug within the chamber, and suitable operating means adapted to shift the plug into and out of tight wedging and sealing engagement with the wall of the chamber and to rotate it in a manner to shift the aperture therein into and out of register with the flow passage. In the ordinary plug valve, the operating means usually consists of an operating stem fixed to the larger end of the tapered plug to project laterally from one side of the body through suitable sealing and packing means, and provided with an operating handle, or the like, at its outer end.

As a result of the above relationship of parts, the ordinary plug valve is unbalanced, that is, the fluid pressure within the body tends to force the plug out of seating engagement in the chamber and further tends to force the plug out of the body. As a result of this unbalanced condition, the ordinary plug valve construction must be made extremely heavy and strong to withstand the forces which tend to displace the plug and often requires the provision of complicated and costly thrust bearings about the stem to reduce the friction between the plug and the body which resists movement of the plug by the operating means.

Due to the precision fit required between the tapered plug and plug chamber of the ordinary valve construction of the character referred to, and due to the severe working conditions under which such valves must operate, their effective life is often rather short and their effective operation cannot be depended upon.

Attempts have been made to provide plug valves wherein no taper is required, in order to establish a hydraulically balanced valve and in order to simplify and reduce the cost of manufacturing. Such attempts have primarily consisted of providing a precision, fluid-tight fit between the wall of the valve chamber and the plug. While such valves have proven to be satisfactory for limited lengths of time when handling fluids of a particular nature under extremely low pressures and at uniform temperatures, they are not at all satisfactory for high pressure use for use in handling corrosive fluids or fluids having foreign matter therein, or for use under conditions where temperature changes occur. When such valves are subjected to high pressures or to temperature variations, or are used to handle corrosive fluids or fluids carrying foreign matter, they bind and freeze up or are otherwise rendered inoperative.

An object of the present invention is to provide an improved plug valve construction wherein the plug and the valve chamber have straight, cylindrical walls.

Another object of the present invention is to provide a valve of the character referred to which is not subject to binding or freezing up when subjected to high pressures, temperature variations, corrosive fluids and the like.

Another object is to provide a valve construction in which the valve chamber is lined with a segmental valve seat.

A feature of the present invention is to provide a valve of the character referred to wherein the segmental liner or insert in the valve chamber is carried by or associated with a resilient retainer member, which member serves to yieldingly maintain the segments of the liner in bearing sealing engagement with the plug and allows for limited shifting of the segments when the valve is operated.

Another object of my invention is to provide a valve construction so hydraulically balanced that the plug is not subject to being urged out of seated engagement and out of the body by the fluid pressure within the valve.

A further object of the present invention is to provide a valve of the character referred to which does not require the use of special and costly bearing means to retain the plug in the body and which is light in weight and neat and compact in size and shape.

A further object of my invention is to provide a valve of the character referred to wherein the segmental liner assembly can be easily and quickly replaced without the necessity of removing the valve from the pipe line in which it is connected and without the use of special tools or skill.

Another object of the present invention is to provide a valve of the character referred to having grease packing means to introduce grease between the segmental insert and t·e plug when circumstances require and in order to assure a fluid tight seal therebetween.

It is still another object of this invention to provide a valve of the character referred to which is easy and economical of manufacture, easy and economical to maintain and which is both hig..ly effective and dependable in operation.

Other objects and features of my invention will be fully understood from the following detailed description of a typical form and application of my invention, throughout which description reference is made to the accompanying drawings, in which:

FIG. 1 is a perspective of the valve construction provided by the present invention.

FIG. 2 is an enlarged detailed sectional view of the valve construction of the invention taken as indicated by line 2—2 on FIG. 1.

FIG. 3 is a transverse sectional view of the valve construction of FIGS. 1 and 2 taken as indicated by line 3—3 on FIG. 2.

FIG. 4 is a sectional view of a portion of the construction illustrated in FIG. 3 and showing the plug in another or open position.

FIG. 5 is an exploded perspective of the valve construction of the invention.

FIGS. 6 through 9 are enlarged detailed sectional views of a portion of the construction of the valve of the invention, and illustrating the manner in which certain of the parts are engaged or assembled.

The valve construction provided by the present invention is shown as involving generally an elongate, horizontally disposed body A having a central, longitudinal flow passage 10 extending therethrough and an upwardly opening valve chamber 11 intersecting the flow passage intermediate its ends, a segmental valve seat assembly B of cylindrical form lining the chamber, a vertically disposed, cylindrical valve member C rotatable within the assembly B and having an operating stem projecting upwardly therefrom to terminate at a point at the exterior of the body, a keeper ring D threadedly engaged in the upper end of the chamber and freely receiving the stem 12 and adapted to maintain the valve seat assembly B and the valve member C in working position in the body, sealing means E carried by the valve member to seal with the body and keeper ring, operating means F fixed to the upper end of the operating stem 12 and grease packing means G related to the valve member and adapted to facilitate the introduction of grease between the valve member C and the insert assembly B and between the said assembly B and the body.

The body A is an elongate, horizontally disposed member having an enlarged, vertically disposed, cylindrical central portion 14 having flat top and bottom ends, and like, polygonal end portions 15.

The flow passage 10 extending through the body A is a simple, straight bore and extends longitudinally through the body from one end to the other. The ends of the flow passage 10 are internally threaded as at 16 to cooperatively receive suitable pipes P, or the like.

It is to be understood that in practice, the body A could be provided with pipe flanges or any other suitable type of pipe connecting means as might be desired without in any way affecting the effectiveness of the present invention.

The valve chamber 11 in the body A is a simple, straight bore entering the body from the upper or top end thereof and terminating at a flat bottom 17. The body A is further provided with a first counterbore 18 concentric with the chamber 11 and terminating at a flat bottom 19, and is provided with a second counterbore 20 of limited diametric extent concentric with the first counterbore and open to atmosphere at the lower or bottom end of the body.

The upper end of the valve chamber is internally threaded as at 21, adapting it to receive the keeper ring D as will hereinafter be described.

The annular valve seat assembly B is shown as including a pair of like, arcuate side segments, or segmental inserts 22, a pair of like, arcuate, ported end segments, or segmental inserts 23 and an annular retainer sleeve 24 engageable about the segments to maintain them in assembled relationship.

The side inserts 22 are like, simple, elongate, vertically disposed segments having arcuate inner and outer surfaces 25 and 26, and flat, vertically disposed sides 29. The sides 29 are parallel to each other and lie in planes normal to the longitudinal axis of the body A.

The end inserts 23 are like, simple, elongate, vertically disposed segments having arcuate inner and outer surfaces 30 and 31, flat, horizontally disposed tops and bottoms 32 and 33 and flat, vertically disposed sides 34. The sides 34 of each segment 23 lie in the same plane and this plane is normal to the longitudinal axis of the body so that the sides 34 of the segments 23 establish flat, opposed, butting engagement with the ends 29 of the side segments 22, as clearly illustrated in the drawings.

Each of the end segments 23 further includes a central port 35 corresponding in diameter with the flow passage 10 of the body, and a radially outwardly projecting orienting and bearing boss 36 surrounding the port 35 and having an arcuate outer face 37 adapted to seat on the wall of the valve chamber 11 in the body.

In the case illustrated, the bosses 36 are shown as being of square outside configuration. It is to be understood however, that the bosses 36 could be round or of any other desired outside configuration.

The bosses 36 are adapted to seat against the wall of the valve chamber in the body and to maintain the retainer sleeve 24 in proper orientation with the segments.

The retainer sleeve 24 is an elongate, vertically disposed, tubular member formed of rubber or rubber like material, and corresponds in vertical extent with the segments 22 and 23. The sleeve 24 has vertically straight, cylindrical inner and outer walls 38 and 39, flat top and bottom ends 40 and diametrically opposed boss receiving openings 42.

In addition to the foregoing, the sleeve 24 is provided with beads 43 about its upper and lower ends and projecting upward and downward, respectively, therefrom. The sleeve 24 is likewise provided with sealing beads 44 formed about the perimeter of, and in effect defining, the boss receiving openings 42.

The sealing beads 44 are substantially round in cross-section and each in integrally joined to the main body of the sleeve by a web 44' of reduced thickness which extends between the outer perimeter of the bead and the main body of the sleeve. The beads are slightly greater in diametric extent than the combined thickness of the main body of the sleeve and the axial extent of the bosses 36, and the webs 44' which connect the beads 44 to the sleeve 24 are considerably thinner than the main body of the sleeve, as clearly illustrated in the drawings.

The end segments 23 are arranged within the retainer sleeve 24 so that the bosses 36 thereof project through the openings 42 defined by the beads 44. The side segments 22 are then slid into the sleeve and into engagement with the end segments and so that the segments 22 and 23 cooperate to establish a cylindrical assembly with which the valve member C therewithin is slidably engaged.

The inner walls 25 and 30 of the segments 22 and 23 are suitably machined and honed or polished to cooperatively receive and seal with the valve member C.

The assembly B thus assembled and with the valve member C therein, is slid into the valve chamber 11 to seat on the bottom 17 thereof. The assembly B is positioned within the chamber 11 so that the ports 35 in the end segments 23 register with the flow passage 10 in the body, and so that the sealing beads 44 establish pressure sealing engagement between the end segments and the wall of the valve chamber, about the ports in the said segments and the flow passage in the body.

In practice and to assure proper positioning of the assembly in the body A, I provide suitable orienting means K, which means is shown as including suitable openings 46 in the upper and lower ends of the side segments 22 and upwardly projecting positioning pins 47 in the bottom of the valve chamber and engageable in the openings 46 in the lower ends of the segments. It will be apparent that the means K serves to maintain the assembly B in proper rotative position in the body A.

It is to be understood that any suitable orienting means could be provided and that the means K shown and described is only illustrative of one suitable form of orienting means that can be advantageously employed.

In practice, the assembly B enters the valve chamber 11 freely and is thereafter acted upon by the keeper ring D to fit snugly in the body and about the valve member C, as will hereinafter be described.

When the assembly B is arranged in the chamber as set forth above, the sealing beads 44 are deformed between the end segments and the wall of the chamber to establish a fluid tight seal therebetween.

The valve member C is an elongate, vertically disposed, cylindrical member having a cylindrical, polished or honed side wall 50, flat, horizontally disposed top and bottom walls 51 and 52 and a horizontally disposed flow conducting passage 53 extending diametrically through it intermediate its ends. The flow passage 53 corresponds in diametric extent with the flow passage 10 in the body and with the ports 35 in the assembly B.

The valve member C further includes upper and lower cylindrical bosses 54 and 55, concentric with the member and projecting from the top and bottom ends 51 and 52 thereof. The bosses 54 and 55 are of the same diametric extent and have straight, cylindrical side walls and flat, horizontally disposed ends.

The lower boss 55 of the member C is adapted to rest or seat on the bottom 19 of the first counterbore 18 in the body and to cover the second counterbore 20, while the upper boss 54 opposes the bottom of the keeper ring D, as will hereinafter be described.

The valve member C is further provided with an operating stem 12, mentioned in the foregoing, which stem is a simple, straight, vertically disposed, cylindrical member projecting upwardly from the end or top of the upper boss 54. The upper portion of the stem 12 is provided with circumferentially spaced flats 56 about its periphery, which flats are adapted to cooperate and establish driving engagement with the operating means F, as will hereinafter be described.

The upper terminal end of the stem 12 is externally threaded as at 57 to receive a suitable lock nut 58, which nut serves to maintain the operating means F in proper working position on the stem.

The keeper ring D is an externally threaded, disc-shaped member having a flat top 60, a flat bottom 61 and a central opening 62 adapted to freely receive the operating stem 12 of the valve member C.

The keeper ring D is further provided with an annular downwardly projecting insert engaging boss 63 having a flat, horizontally disposed bottom 64, and with an upwardly projecting, annular boss 65 with a plurality of tool engaging flats 66 about its outer periphery and adapted to facilitate advancing the ring D into the upper threaded portion of the valve chamber 11 in the body A.

During assembly of the valve of the invention, when the keeper ring D is threadedly engaged in the body and is advanced into engagement with the insert assembly B, the beads 43 at the upper and lower ends of the retainer sleeve 24 are initially deformed so that the entire sleeve is expanded radially inwardly and outwardly and urges the segments 22 and 23 into snug bearing engagement with the plug C.

In practice, it has been found that the retainer sleeve need not be deformed to such an extent that it establishes any appreciable pressure on the elements and ports related thereto, but only to such an extent that it prevents excess play and resulting working of the segments of the insert.

A suitable O-ring seal 67 is provided about the base of the boss 63 on the ring D to seal between the boss and the body and thereby prevent the escape of fluid therebetween.

The sealing means E comprises a pair of like, annular seals 70 and 71 engaged about the bosses 54 and 55, respectively, of the valve member C. The seal 70 is adapted to seal between the top end 51 of the valve member C and the bottom 61 of the keeper ring D, while the seal 71 is adapted to seal between the bottom 52 of the valve member C and the bottom 19 of the first counterbore 18 in the body A.

Each of the seals 70 and 71 is shown as including an inner ring 72 of tough durable plastic such as Teflon, having a radially outwardly opening V-shaped groove about its exterior, and an outer ring 73 of flexible material, such as rubber, substantially V-shaped in cross-sectional configuration and seated in the groove in the inner ring.

With the above relationship of parts, it will be apparent that the upper and lower ends of the valve member C are suitably sealed with the keeper ring D and the body A. The fluid under pressure within the construction tends to urge the seals 70 and 71 into tight pressure and sealing engagement with the parts of the construction related thereto.

In practice, the seals 70 and 71 can vary widely in form and construction, it being understood that the particular seals illustrated and described above are only typical of one preferred form of seal that can be advantageously employed.

It will also be apparent that since the bosses 54 and 55 are of like diameter and since the seals 70 and 71 related thereto are alike, the valve member C is balanced within the construction and is not urged axially either upwardly or downwardly by the fluid pressure within the construction.

The operating means F comprises a substantially disc-shaped wheel 80 having a central, polygonal opening 81 therein to receive the upper portion of the stem and establish driving engagement with the flats 56 thereon. The wheel 80 is provided with the hereinbefore mentioned plurality of circumferentially spaced, tangentially disposed, tubular portions 82 about its periphery, each adapted to receive a suitable operating bar. The wheel 80 is maintained on the stem by a lock nut 58 screwed onto the upper terminal end of the stem.

A stop pin 83 is provided on the underside of the operating wheel 80 to engage in an arcuate channel 84 in the top of the body A to limit rotation of the valve member C and to stop it in either its open or closed position.

An annular, felt dust seal 85 is provided between the bottom of the operating wheel 80 and the top of the annular boss 65 at the top of the keeper ring D. The dust seal 85 serves to prevent dust and the like, from entering the construction around the operating stem 12.

The grease packing means G includes a longitudinally disposed bore 90 entering the top of the stem 12 and terminating at a point below the top 51 of the valve member C, a lateral port 91 in the upper portion of the valve member and communicating with the lower end of the bore 90, and a vertically disposed port 92 in the outer peripheral portion of the valve member to connect with the port 91 and establish open communication with the spaces between the top of the valve member and the bottom of the keeper ring D and between the bottom of the valve member and the bottom 19 of the first counterbore 18. The port 92 communicates with the above-mentioned spaces at points spaced radially outwardly of the seals 70 and 71.

The means G further includes a suitable grease fitting and check valve assembly 93 threadedly engaged in the upper end of the bore 90 and accessible at the top of the construction. In operation, grease is forced under pressure through the grease fitting and valve assembly 93 into and through the bore 90 and the ports 91 and 92. The grease enters said space above and below the valve member and flows into and through the insert assembly B to establish a grease seal between the said assembly and the valve member C.

Due to the sectional nature of the insert assembly, the grease flows freely through and fully occupies all of the voids throughout the assembly and about the exterior of the valve member.

In order to prevent air or fluid under pressure from being trapped between the insert assembly and the wall of the valve chamber, suitable registering ports 95 and 96 are provided in the side segments 22 and the retainer ring 24, respectively. This is important because when fluid under pressure is trapped between the wall of the valve chamber 11 and the insert sleeve 24, it exerts force through the assembly B and onto the plug, which force tends to lock and bind the valve member in the construction. It is therefore extremely important that suitable means be provided to relieve any pressure occurring about the exterior of the sleeve from the construction.

Rubber and certain resilient rubber-like materials will, when packed in grease and the like, absorb some of the grease and as a result will swell and expand. As a result of this tendency for rubber to swell when packed in grease, the grease in the instant invention, in addition to establishing a seal between the several parts of the assembly B and the elements of the construction directly associated therewith, also serves to swell the rubber sleeve 24 in a manner to enhance its ability to maintain the assembly B in proper bearing engagement in the construction.

It is to be understood that the sleeve 24 can be formed of a material other than rubber and a material that does not tend to swell up when in the presence of grease, or the like, without any adverse effects.

In practice, the sleeve can be initially molded in the form of an elongate, flat strip having the openings 42 and the beads 43 and 44 formed thereon and subsequently wrapped or bent into circular form and suitably bonded. Alternatively, the sleeve can be initially formed in the manner set forth above and subsequently wrapped about the assembly B loosely; however, such a practice makes assembly more difficult.

With the construction provided by the present invention, a two inch valve designed for operation under pressures of fifteen thousand p.s.i. measures about eight and one-half inches long, eight and one-quarter inches high and seven and three-quarter inches wide. Such a valve weighs sixty-five pounds and is such that it can be operated with the exertion of considerably less torque on the operating stem than the ordinary or conventional plug valve construction.

Due to the resilient nature of the insert assembly, the valve member C will not freeze or bind in the insert assembly and the operating means F need not be struck or hammered to free the valve in order to initiate operation of the valve of the invention, as in the case of the ordinary plug valve construction.

It will be apparent that when it is desired to rebuild the valve of this invention, it is only necessary to remove the operating wheel 80, disengage the keeper ring D, remove the worn or used valve member C and the assembly B from the body A, replace them with a new part and then replace the ring D and wheel 80. The above operation can be easily and quickly performed in the field without the necessity of removing the body A from the pipe line in which it is connected and without the use of special tools or the exercise of special skill.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. A fluid handling valve including a body having a flow passage extending therethrough and a chamber intersecting the flow passage, a resilient retainer in the chamber, a segmented valve seat assembly mounted within the retainer and including a plurality of segmental inserts, and a valve member having a fluid passage extending through it, said valve member being rotatable within said valve seat assembly in fluid sealing engagement therewith, said retainer and valve seat assembly having openings and ports in axial alignment with the flow passage in the body, said inserts having radially outwardly projecting bosses about the ports and projecting through the openings in the retainer to bear against the wall of the chamber about the flow passage, said resilient retainer normally yieldably maintaining the segmental inserts in bearing sealing engagement with the valve member.

2. A fluid handling valve including a body having a horizontal flow passage extending therethrough and a cylindrical chamber intersecting the flow passage, a resilient retainer sleeve lining the chamber, a segmented valve seat assembly including a plurality of arcuate segments mounted within the retainer sleeve, and a cylindrical valve member having a fluid passage extending diametrically therethrough, said valve member being rotatably mounted in said valve seat assembly, said retainer sleeve and valve seat assembly having openings and ports in axial alignment with the flow passage in the body, said inserts having radially outwardly projecting bosses about the ports and projecting through the openings in the retainer sleeve to bear against the wall of the chamber about the flow passage, said resilient retainer sleeve normally yieldably maintaining the segmental inserts in bearing sealing engagement with the valve member.

3. A fluid handling valve including a body having a flow passage extending therethrough and a cylindrical chamber intersecting the flow passage, a resilient retainer sleeve in the chamber, a segmented valve seat assembly including a plurality of arcuate segmental inserts mounted within the retainer sleeve, a cylindrical valve member rotatably mounted within said seat assembly in fluid sealing engagement therewith and having a fluid passage extending diametrically through the valve member, said retainer sleeve and inserts having openings and ports in axial alignment with the flow passage in the body, said inserts having radially outwardly projecting bosses about the ports thereof projecting through the openings in the retainer sleeve and bearing against the wall of the chamber of the flow passage, said resilient retainer sleeve normally yieldably maintaining the segmental inserts in bearing sealing engagement with the valve member, and operating means carried by the valve member and projecting from the body and operable to rotate said valve member to shift the flow passage therein into and out of register with said ports, openings, and flow passage.

4. A fluid handling valve including a body having a flow passage extending therethrough and a chamber intersecting the flow passage, a resilient retainer lining the chamber, segmental inserts defining a valve seat within the retainer, and a valve member rotatably mounted within the valve seat in sealing engagement with the inserts and having a fluid passage extending diametrically through the valve member, said retainer and inserts having openings and ports in axial alignment with the flow passage in the body, said inserts having radially outwardly projecting bosses about the ports and projecting through the openings in the retainer and bearing against the wall of the chamber about the flow passage, said resilient retainer normally yieldably maintaining the segmental inserts in bearing sealing engagement with the valve member, said retainer having sealing means about the perimeter of the openings therein to seal between the body and the inserts about the bosses on the inserts.

5. A fluid handling valve including a body having a horizontal flow passage therethrough and a vertical cylindrical chamber intersecting the flow passage, a resilient retainer sleeve lining the chamber, a cylindrical array of segmental inserts in the retainer, a vertically disposed cylindrical valve member rotatably mounted with said array of inserts in fluid sealing engagement therewith and having a horizontal fluid passage extending through the valve member, said retainer and inserts having openings and ports in axial alignment with the flow passage in the body, means anchoring the inserts to the body to retain the ports in the inserts in alignment with the flow passage, said inserts having radially outwardly projecting bosses about the ports and projecting through the openings in the retainer to bear against the walls of the chamber about the flow passage, said bosses engaging the retainer to retain the openings in the retainer in alignment with the ports and the flow passage, said resilient retainer sleeve normally yieldably maintaining the segmental inserts in bearing sealing engagement with the valve member, operating means carried by the valve member to project from the body and operable to rotate said valve member to shift the flow passage therein into and out of register with said ports, openings, and flow passage, and sealing means about the perimeter of the openings in the retainer to seal between the body and the inserts about the bosses on the inserts.

6. A fluid handling valve including a body having an elongate, horizontally disposed flow passage extending through it and a vertically disposed, upwardly opening chamber, an annular keeper closing the upper end of the chamber, a tubular, resilient retainer in the chamber and having openings registered with the flow passage, a tubular insert including a plurality of vertically disposed, circumferentially arranged segments within the retainer and having radially inwardly disposed, arcuate sealing faces, a vertically disposed, cylindrical valve member having an upwardly projecting operation stem and a horizontally disposed flow passage extending through it, said valve member being rotatable relatively to the insert and establishing sealing engagement therewith, said stem projecting through the keeper, and operating means connected with the stem to rotate the valve member to shift the flow passage therein into and out of register with the flow passage in the body, said insert having bosses thereon projecting through the openings in the retainer to seat on the wall of the chamber and having ports therein in alignment with the openings in the retainer and with the flow passage in the body.

7. A fluid handling valve including a body having a flow passage extending therethrough and a cylindrical chamber intersecting the flow passage, a resilient retainer sleeve lining the chamber, a segmented valve seat assembly including diametrically opposite segmental inserts mounted within the retainer sleeve, and a cylindrical valve member rotatably mounted in said valve seat assembly and having a fluid passage extending diametrically therethrough, said retainer sleeve and seat assembly each having openings in axial alignment with the flow passage in the body, said inserts having radially outwardly projecting bosses about the openings therein projecting through the openings in the retainer sleeve and bearing against the wall of the chamber about the flow passage, said resilient retainer serving to normally yieldingly maintain the segmental inserts in bearing sealing engagement with the valve member, said retainer sleeve including a web encircling each of said openings in the sleeve, each of said webs being thinner than the body of the sleeve, and said sleeve including a sealing bead integral with each of said webs and joined to the body of the sleeve by the associated web, said beads being thicker than the body of the sleeve and being deformed between the inserts and said body.

8. A fluid handling valve including a body having a flow passage extending therethrough and a cylindrical chamber intersecting the flow passage, a resilient sleeve lining the chamber, means providing a cylindrical valve seat mounted within the sleve, a cylindrical valve member rotatably mounted in said valve seat and having a fluid passage extending diametrically therethrough, said sleeve and valve seat having openings and ports in axial alignment with the flow passage in the body, a sealing bead encircling each of said openings in the sleeve and under compression between the seat and said valve body, and a web thinner than the sleeve connecting each of said beads to the sleeve.

9. A fluid handling valve including a body having a flow passage extending therethrough and a cylindrical chamber intersecting the flow passage, a resilient retainer sleeve lining the chamber, a segmented valve seat assembly including a first pair and a second pair of segmental inserts mounted within the retainer sleeve, and a cylindrical valve member rotatably mounted in said valve seat assembly and having a fluid passage extending diametrically therethrough, said retainer sleeve and seat assembly each having openings in axial alignment with the flow passage in the body, the inserts of said first pair having radially outwardly projecting bosses about openings therein, said bosses projecting through the openings in the retainer sleeve and bearing against the wall of the chamber about the flow passage, said resilient retainer sleeve serving to normally yieldingly maintain the segmental inserts in bearing sealing engagement with the valve member, the sides of one of the inserts of said second pair being parallel to each other and lying in planes perpendicular to the axis of said flow passage, the sides of the two inserts of said first pair adjacent said one insert of said second pair lying in planes perpendicular to said axis and making flat abutting engagement with said parallel sides of said one insert of said second pair, said one insert of said second pair being removable from the valve seat assembly by movement radially inward of said chamber in the absence of said valve member from within the seat assembly.

10. A fluid handling valve including a body having a flow passage extending therethrough and a cylindrical chamber intersecting the flow passage, a segmented valve seat assembly including a first pair and a second pair of diametrically opposite segmental inserts mounted in operative positions within the chamber, and a cylindrical valve member rotatably mounted in said valve seat assembly and having a fluid passage extending diametrically therethrough, the inserts of said first pair having openings therethrough in axial alignment with the flow passage in the body, the sides of one of the inserts of said second pair being parallel to each other and lying in planes perpendicular to the axis of said flow passage, the sides of the two inserts of said first pair adjacent said one insert of said second pair lying in planes perpendicular to said axis and making flat abutting engagement with said parallel sides of said one insert of said second pair, said one insert of said second pair being initially removable from the valve seat assembly by movement radially inward of said chamber to space its entire radially outer surface from the wall of the chamber in the absence of said valve member from within the seat assembly and while the other three segments remain in their said operative positions within the chamber.

References Cited in the file of this patent

UNITED STATES PATENTS

| | | |
|---|---|---|
| 262,935 | Dibble | Aug. 22, 1882 |
| 2,424,210 | Sutton | July 15, 1947 |
| 2,433,732 | Brown | Dec. 30, 1947 |
| 2,493,966 | Hartley | Jan. 10, 1950 |
| 2,559,695 | Allen | July 10, 1951 |
| 2,646,247 | Hamer | July 21, 1953 |
| 2,651,490 | Clade | Sept. 8, 1953 |
| 2,813,695 | Stogner | Nov. 19, 1957 |
| 2,864,580 | Lemoine | Dec. 16, 1958 |